Jan. 13, 1959 E. P. STEPHENSON 2,869,045
BEAT FREQUENCY TIMER
Filed July 28, 1954 3 Sheets-Sheet 1
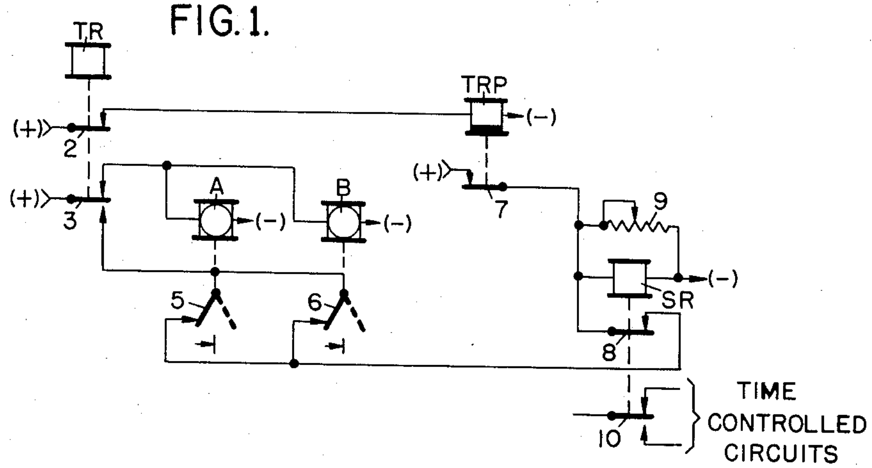
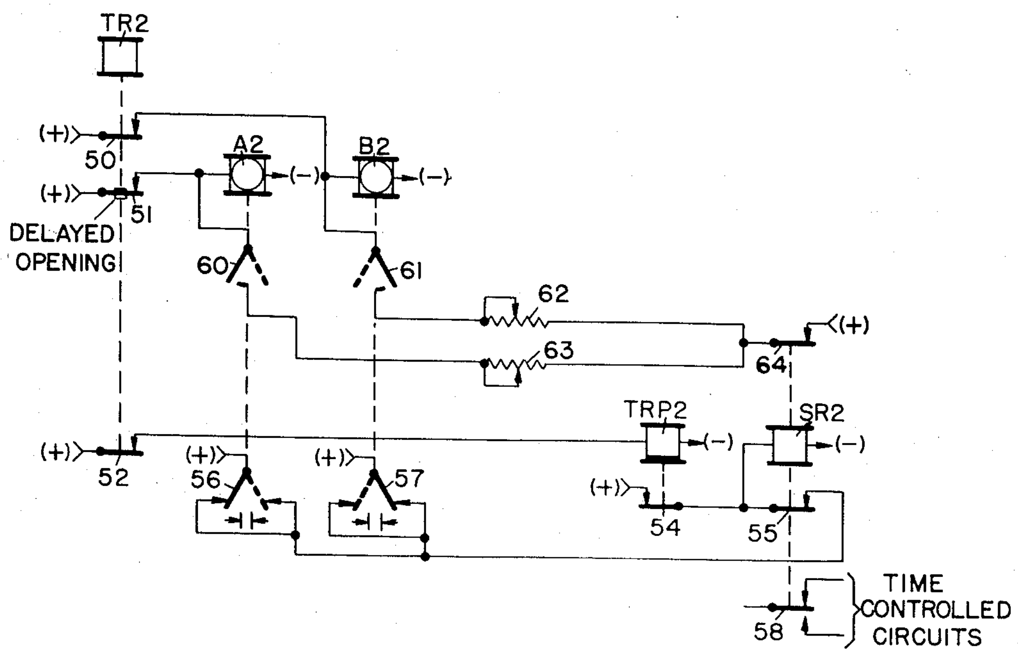
INVENTOR.
E. P. STEPHENSON
BY
Forest B. Hitchcock
HIS ATTORNEY

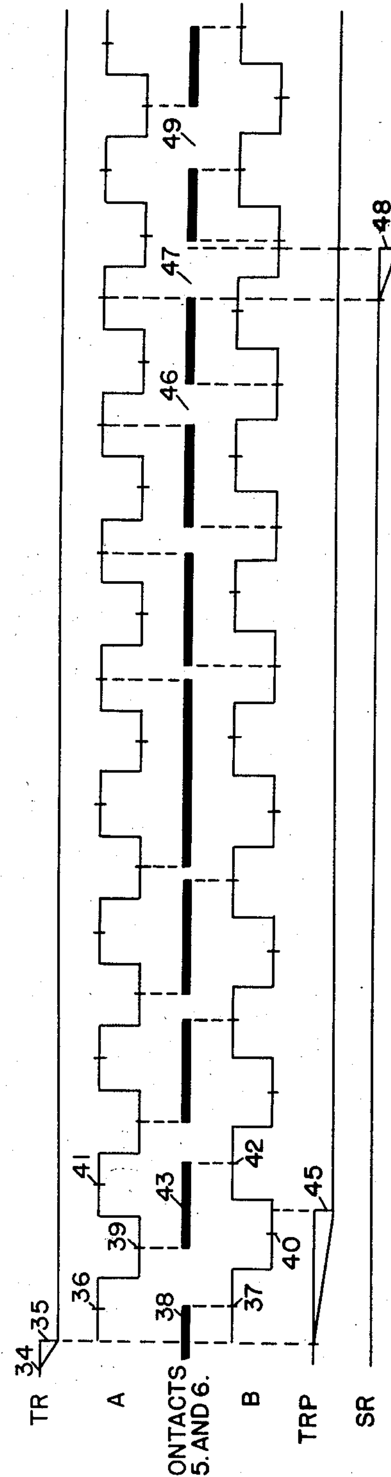
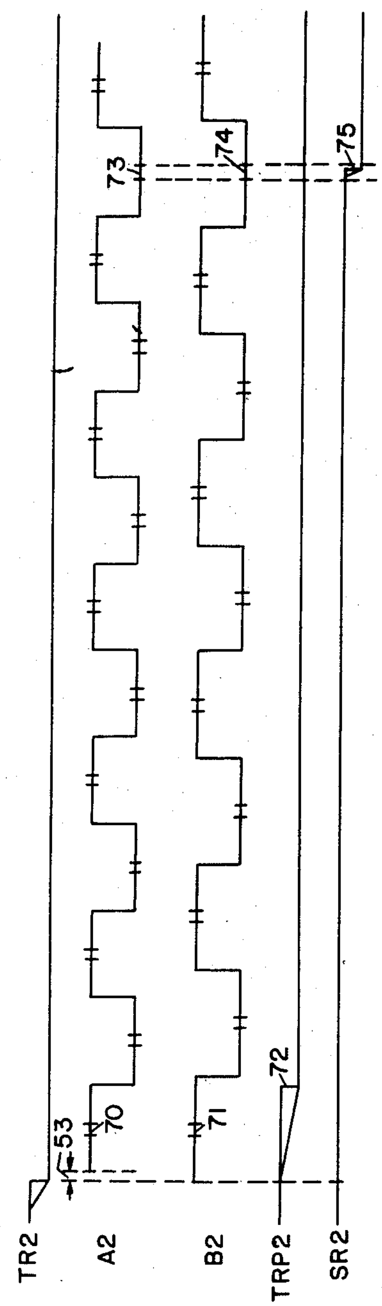
INVENTOR.
E.P. STEPHENSON
BY
Forest B. Hitchcock
HIS ATTORNEY INVENTOR.
E.P. STEPHENSON
BY
Forest B. Hitchcock
HIS ATTORNEY United States Patent Office 2,869,045

Patented Jan. 13, 1959

2,869,045

BEAT FREQUENCY TIMER

Eric P. Stephenson, Leaside, Ontario, Canada

Application July 28, 1954, Serial No. 446,224

5 Claims. (Cl. 317—135)

This invention relates in general to timing means, and has more particular reference to a timing means for electric circuits which is more particularly adapted for use in railway signaling.

In railway signaling it is desirable to have a timing organization which is designed to operate in a way that a failure of its operation will be on the side of safety. The most common form of timing means measures a predetermined time following the occurrence of a particular event, with the organization arranged to measure a longer time in case of a failure of the timing device. This type of timing means is particularly useful in connection with time released approach locking in railway signaling.

Another form of timing means is one which will measure a predetermined time after the occurrence of an event, but in case it fails to operate the time which it then measures becomes shorter than its usual measured time. This type of time measuring means is particularly useful in connection with highway crossing signals where it may be desirable to withhold the application of the crossing signals for a predetermined time under certain circumstances but if the timing device should fail then it is desirable that the crossing signals be initiated almost immediately.

One of the objects of the present invention is to provide a timing organization which measures a shorter than usual time in the case of a failure of the timing device.

Another object of the present invention is to provide such a timing organization which is capable of measuring a substantial time such as in the order of three to five minutes, but without requiring an undue amount of apparatus.

Another object of the present invention is to provide a timing organization of this type in which the time measuring means has inherently stable characteristics by the use of the well known pendulum principle.

Generally speaking, and without attempting to describe the exact nature and form of the present invention, it is proposed to provide two pendulum type oscillators of inherently different frequencies which may be set into operation simultaneously and which will measure off a predetermined time by reason of the fact that these oscillators will assume corresponding positions in their cyclic operations at a substantially lower beat frequency.

More specifically, it is proposed that these two pendulum type oscillators will be of the normally energized type and will be set into operation upon their deenergization so that their pendulums may freely swing back and forth at their natural frequencies. A circuit is jointly controlled by said oscillators to normally energize a relay which is caused to be responsive to the occurrence of the beat characteristic upon the coincident opening of the contacts of both oscillators to terminate the timing operation.

It is proposed to provide the entire timing organization with circuits arranged in a manner that the failure of either the pendulum type oscillators or the circuits will result in giving a shorter time than that ordinarily measured by the organization.

Other objects, purposes and characteristic features of the present invention will be in part obvious from the accompanying drawings, and in part pointed out as the description progresses.

In describing the invention in detail, reference will be made to the accompanying drawings, in which like reference characters designate corresponding parts throughout the several views, and in which:

Fig. 1 is a diagrammatic illustration of one form of timing organization constructed in accordance with the present invention;

Fig. 2 is a diagrammatic illustration of another form of timing organization constructed in accordance with the present invention;

Fig. 3 is a diagrammatic timing chart to illustrate one timing operation of the form of the invention shown in Fig. 1;

Fig. 4 is a timing chart to illustrate one timing operation of the form of the invention shown in Fig. 2.

Figure 5:
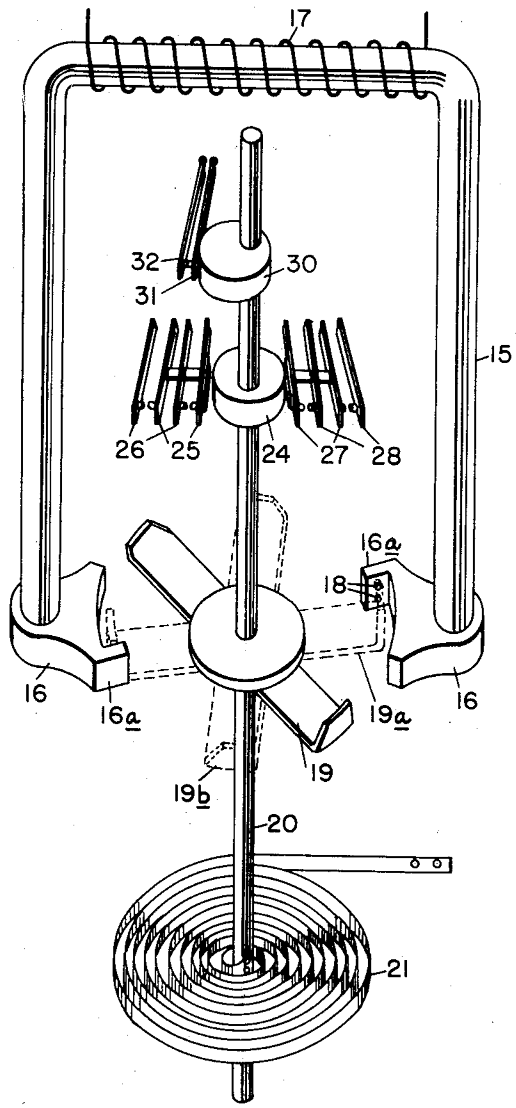
Figs. 5 and 6 illustrate one form of pendulum type oscillator which may be used as an element in the timing organization provided in accordance with the present invention.

For the purpose of simplifying the illustration and facilitating in the explanation, the various parts and circuits constituting the embodiment of the invention have been shown diagrammatically and certain conventional illustrations have been employed, the drawings having been made more with the purpose of making it easy to understand the principles and mode of operation than with the idea of illustrating the specific construction and arrangement of parts that would be employed in practice. Thus, the various relays and their contacts are illustrated in a conventional manner and symbols are used to indicate connections to the terminals of batteries, or other sources of electric current instead of showing all of the wiring connections to these terminals.

The symbols (+) and (−) are employed to indicate the positive and negative terminals respectively of suitable batteries, or other sources of direct current; and the circuits with which these circuits are used always have current flowing in the same direction. While the invention may be used in various settings either in connection with railway signaling or general applications where timing devices and organizations are required, the present invention has been shown more particularly as applied to measuring a predetermined time following the release of a track relay in connection with railway signaling systems. More specifically, with reference to Fig. 1, a track relay TR is shown as having a plurality of contacts such as contacts 2 and 3. The track relay TR is normally picked up, but as is well known in the art, the presence of a train causes the shunting of the track relay which results in the release of its armature and the opening of its contacts.

In addition, a track repeating relay TRP of the slow release type is shown as being controlled through front contact 2 of the track relay TR. This relay is made to have slow releasing characteristics which are preferably of a predetermined duration which will be explained more fully in connection with a typical operation and with reference to Fig. 3.

Two pendulum type oscillators A and B are normally energized through front contact 3 of the track relay TR so as to hold their pendulums in corresponding full energized positions; but when the track relay TR becomes deenergized these oscillators A and B are deenergized and their pendulums freely swing so as to move their respective contacts 5 and 6 back and forth at their respective inherent frequencies. These contacts 5 and 6 are closed only during a portion of the swinging movement of their respective pendulums. More specifically, contact 5, for example, is closed only while it is to the left of center, and is closed throughout the time that it is to the left of its center position as indicated by the arrow and line directly beneath the contact 5. Contact 6 is similarly constructed. Both of these contacts 5 and 6 have been shown as having the same characteristics and it should also be understood that the center position indicated is just a very slight degree to the left of center which cannot be readily illustrated in the drawing without undue exaggeration. This is so that should the oscillators A and B become deenergized and fail to oscillate because they have been deenergized for a considerable period of time, the contacts 5 and 6 will then come to rest at exactly the center positions of the oscillators, in which positions these contacts should be open and allow the release of the other circuits presently to be described. This is so as to provide the circuit organization on the "fail safe" principle. But since the point at which these contacts close is just slightly to the left of center and since they remain closed until the oscillator has again returned to that point just slightly to the left of center, it is believed sufficient that this be described; and such feature has thus been omitted from the illustration in Fig. 1 and also from the diagram in the chart of Fig. 3.

Associated with the oscillators A and B is a stick relay SR which is normally energized through a front contact 7 of the track repeating relay TRP by an obvious circuit. This stick relay SR is provided with a front contact 8 which is included in a stick circuit subject to control by the contacts 5 and 6 of the oscillators A and B connected in multiple and also subject to back contact 3 of the track relay TR. The stick relay SR has an adjustable resistor 9 shunted around its windings so that the time required for the release of this relay may be adjusted relatively closely to the predetermined value required for its release for reasons which will be later described in connection with Fig. 3. This stick relay SR also has added contacts as represented by contact 10 for the purpose of either opening or closing other circuits which are desired to be controlled in accordance with the measured time. This is indicated in Fig. 1 by the legend "Time Controlled Circuits."

Figure 6:
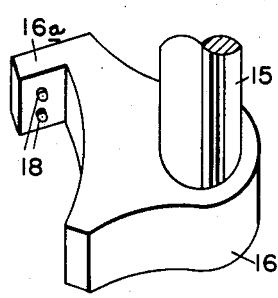

For the purpose of making the disclosure definite, a diagrammatic illustration of a typical oscillator constructed to accomplish the purpose of the present invention has been shown in Figs. 5 and 6. This oscillator structure may be of any suitable design, one of which may be found in the patent application of N. B. Coley, Serial No. 321,259 filed November 18, 1952, now Patent No. 2,724,063; and no claim is made herein to any features found to be in common with such prior Coley application.

With reference to Fig. 5, a structure has been shown as including a U-shaped core 15 with pole pieces 16 at its open ends. A winding 17 is shown on the closed portion of the U-shaped core 15. The core pole pieces 16 have been shown in enlarged isometric view of Fig. 6, in which it can be more readily seen that each pole piece 16 has an extending stop portion 16*a* which has mounted on its face suitable nonmagnetic residual pins 18. This means to prevent the armature 19 from coming into close magnetic contact with the pole pieces may take any suitable form such as a strip, pins or even an insert of resilient nonmagnetic material.

The armature 19 is mounted on a pivoted shaft 20 which is suitably supported at its opposite ends (supports not shown). The shaft 20 has attached thereto a spiral ribbon spring 21 which has its outer end attached to the frame of the structure. This spring 21 is so adjusted as to cause the armature 19 to assume its solid line position shown when the winding 17 has been deenergized for sufficient time to allow the armature to come to rest at a deenergized position. When the winding 17 is energized the armature 19 is actuated to its dotted line position 19*a* in which the armature is held against the stops 16*a*. This is because these extending portions of the pole face also carry magnetic flux and thus causes the armature to assume a definite position whenever the winding 17 is fully energized.

When the winding 17 is deenergized following the actuation of the armature to its dotted line position 19*a*, the armature swings in a clockwise direction to the position 19*b*. This, of course, passes the intermediate position shown in solid line, and unwinds spring 21 to produce a counterclockwise tension on the shaft 20. For this reason the armature 19 then swings counterclockwise but it just falls short of hitting the stops of 16*a*. In this position, of course, the spring 21 is slightly wound up so that the armature 19 again swings in a counterclockwise direction. This oscillatory free swinging operation continues for a number of cycles which, of course, is dependent upon the extent to which the bearings for the shaft 20 have their friction reduced and also dependent upon the extent to which the associated contacts are operated.

More specifically, a cam 24 is employed to actuate movable contacts 25 when it swings counterclockwise so as to cause such movable contacts 25 to make contact with their respective fixed contacts 26. Similarly, when the shaft 20 and cam 24 is rotated in a clockwise direction, the movable contacts 27 are moved to close with their respective fixed contacts 28. These contacts may be adjusted to open and close at any desired point in the cycle as more specifically described in connection with Figs. 1 and 2.

In addition, a cam 30 is provided to operate a movable contact 31 so that it will make contact with a fixed contact 32 for only a limited portion of the swing of the armature, more particularly as it is passing through a central position. This controls the application of a limited amount of energy through the winding 17 while it is free swinging so as to continue its oscillatory operation for a longer period of time when the devices are used to measure substantially longer periods of time. This form is more particularly used in connection with Fig. 2 and will be described in detail in connection with such figure. It is sufficient to note at this time that when the contacts 31 and 32 close the circuits for winding 17 as the armature 19 is approaching the pole pieces, the current has time to build up and impart momentum to the armature as it is approaching the pole pieces 16 where the magnetic flux can be effective; but the closure of these contacts while the armature 19 is moving in a clockwise direction away from the pole pieces 16, results in no effect on the armature because it is a sufficient distance away from the pole pieces as to not be affected by the magnetic flux when it has had time to build up in response to such momentary energization.

In other words, when the armature is swinging toward the pole pieces, the coil is energized sufficiently in advance so that the magnetic flux has time to build up and produce its maximum effect as the armature swings closely to the pole pieces. When the armature has taken its full swing and is receding from the pole pieces, the circuit is again momentarily closed but due to the self-inductive effect of the winding and core, the flux does not have time to build up until the armature is a substantial distance away from the pole pieces, and for this reason the effect on the armature is negligible. In this way, the maximum force exerted on the armature is given while it is approaching the pole pieces, and this is substantially greater than any effect on the armature while it is receding from the pole pieces. For these reasons, the energization of the winding 17 through the contacts 31 and 32 can be effective to maintain the armature 19 in its oscillatory operation, and by regulating the amount of energy supplied to the winding 17 the amplitude of the armature swings can be controlled.

With the above understanding of the general structural characteristics of the timing organization of Fig. 1, we may now consider its operation in measuring time following the release of the track relay TR.

Referring to Fig. 3 the chart shows the conditions of the different devices as time elapses from left to right. The relay TR is normally picked up as indicated by the line 34, but this relay when deenergized drops its contacts after a short interval indicated at 35 and the contacts continue in the deenergized position so far as this chart shows. The oscillator A is indicated as having its contact 5 in a left-hand closed position. When the contact 3 opens, the oscillators A and B are both deenergized coincident with the occurrence of the point 35. As the oscillators have their armatures swinging to the right (shown in Fig. 1), the contacts 5 and 6 respectively open at the points 36 and 37. Since these contacts 5 and 6 are in multiple, the stick circuit for the relay SR is maintained closed until the contact 6 of oscillator B opens at the point 37. This is indicated by the solid heavy line 38.

When the oscillators A and B have both swung to the right and then returned swinging toward the left, the contacts 5 and 6 are respectively closed at points 39 and 40. This swinging to the left is completed and the cycle of the oscillators A and B is reversed so as to swing towards the right at which time the contacts 5 and 6 respectively open as indicated at points 41 and 42. This means that the circuit through the contacts 5 and 6 in multiple is closed throughout the time indicated by the length of the heavy solid line 43.

This cyclic operation of the oscillators as the armatures swing back and forth is continued as indicated in the chart of Fig. 3, and because these oscillators are of slightly different natural frequencies, the points of opening of the contacts 5 and 6 shift relatively to each other. This makes it so that the time of closure of the stick circuit for relay SR is lengthened until it reaches a maximum and then it is shortened as the cycles continue. It can thus be seen that the space between the contemporaneous closure of contacts 5 and 6 forms a particular pattern so that if the oscillators were to continue indefinitely the occurrence of the maximum open time would periodically take place. However, in accordance with the present invention, and as more particularly shown in Fig. 1, it is contemplated that the relay SR will be adjusted to release within the first time period of maximum opening of both contacts. Although the relay SR is adjusted so that its release time is sufficiently short to allow the relay SR to drop away in a maximum open period of the contacts 5 and 6, such release time is great enough to ride over the times of opening of lesser degree.

It will be noted that upon the initiation of the oscillators there is an occurrence of a maximum opening time at the beginning of the timing operation. The relay TRP is made sufficiently slow releasing as indicated in Fig. 3 to ride over the period during which the contacts 5 and 6 are both opened for this maximum time. This means then that the relay SR, because of closed contact 7, is not dependent upon its stick circuit until the relay TRP has released as indicated at 44. For this reason, the relay SR is maintained picked up as the oscillators A and B operate through their cyclic operations as indicated in the chart of Fig. 3. The relay SR, of course, is deenergized each time both contacts 5 and 6 are coincidentally open, but it does not have time to drop away for any of the openings such as at 46 in Fig. 3. When a long opening time such as 47 takes place then the relay SR is released as indicated at 48. In the chart shown in Fig. 3, maximum open times occur at spaces 47 and 49. Thus, if the relay SR should happen to fail to release during the space 47, it would have more than one chance to release. A second chance occurs during the space 49. However, the timing operation is intended to be effected by the release of the relay SR during the time period 47 so that a predetermined time is measured following the release of the track relay TR by the release of the relay SR at point 48.

It should be understood, that the differences in frequency of the oscillators A and B may be varied and that longer times will be measured when the frequencies are more nearly the same. However, this one combination of frequencies and adjustment of the devices is illustrated in Fig. 3 so as to illustrate the intended operation and make the disclosure clear and definite.

It should be readily apparent that once a timing operation has taken place that the restoration of the track TR closing front contacts 2 and 3 will cause the repeating relay TRP to be picked up and restore the stick relay SR by its energization through front contact 7. In addition, closure of front contact 3 reenergizes the oscillators A and B so that their armatures are operated against their stops and continuously hold the contacts 5 and 6 closed. In this connection, these reference characters have not been made to correspond to the reference characters of Fig. 5 where the structural characteristics of the contacts have been shown. This is because it is to be understood that Fig. 5 is illustrative of one typical structure and a similar structure is used for each of the oscillators, and also this typical structure is representative of the oscillators for both Figs. 1 and 2, Fig. 2 requiring the additional driving contacts. But it is believed that it will be readily understood how the structure of Fig. 5 is employed in Figs. 1 and 2 where the illustrations are wholly diagrammatic employing symbols for the respective oscillators.

With reference to Fig. 2 the track relay TR2 is shown as having contacts 50, 51 and 52. The contact 50 directly energizes the oscillator B2 in an obvious manner. Likewise, the front contact 51 directly energizes the oscillator A2 in an obvious manner, but this contact 51 is indicated as being slightly slow in opening so that upon the release of the track relay TR2 the oscillator A2 is deenergized a very short interval of time following the deenergization of the oscillator B2. This is indicated in the timing chart of Fig. 4 where the difference in deenergization times is illustrated at the point 53. The contact 52 of the track relay TR2 directly energizes the repeater relay TRP2, which in turn, through its front contact 54 directly closes a pick-up circuit for the relay SR2. The relay SR2 has a stick circuit including its own front contact 55, and the contacts 56 and 57 of the oscillators A2 and B2 respectively. The relay SR2 has a contact 58 which is representative of added contacts that such relay may have for either opening or closing other circuits which are desired to be controlled in accordance with the measured time. This is indicated in Fig. 2 by the legend "Time Controlled Circuits."

The oscillators A2 and B2 are illustrated as having contacts 60 and 61. These contacts are assumed to be similar to the contacts 31—32 of Fig. 5 which are operated by the cam for the purpose of closing these contacts at intermediate portions of an operating cycle. This has been illustrated in Fig. 2 by a special symbol associated with the mid portion of the swing of these contacts 60 and 61.

These contacts 60 and 61 are electrically connected to their respective oscillators as shown and are then connected through resistors 62 and 63 and the front contact 64 of relay SR2. When the relay TR2 is released and these oscillators A2 and B2 begin their cyclic operations, they are momentarily energized each time the armature passes through a mid position to a degree as determined by the adjustment of the resistors 62 and 63. This energization is just sufficient to maintain a constant amplitude of operation of the armatures, and is so selected that the armatures do not bump their respective stops on the pole pieces. This is desirable because the bumping of the stops would change the natural frequencies of the pendulums which it is desired to maintain constant and reliable. This driving feature for the oscillators is provided so as to cause their operation over a prolonged period of time and permit a longer time period to be measured by the timing organization.

In this form of the invention, the contacts 56 and 57 are arranged to be closed all the time except during an intermediate portion of the cyclic oscillations. This is illustrated by the small arrows and symbolism immediately beneath the contacts 56 and 57. In other words, the contact 56, which may actually be made up of structure such as shown by contacts 24—28 of Fig. 5, is arranged to open the circuit only momentarily while the armature passes through amid position, and this occurs regardless of the direction of swing of the armature.

With the above understanding of the general structural organization of Fig. 2, it is believed that the operation of the timing means can best be understood by considering a typical operation such as shown in the timing chart of Fig. 4. As previously explained, the oscillator A2, being the one with the higher natural frequency, is deenergized slightly later than the oscillator B2. This is so that the opening of contacts 56 and 57 will occur simultaneously as indicated at the points 70 and 71 in Fig. 4. This establishes the point of correspondence in the beat action between the two oscillators, and which condition will not again occur until a corresponding point in the cyclic beat frequency again takes place. Since the occurrence of this simultaneous opening of contacts 56 and 57 would ordinarily release the stick relay SR2, the repeater relay TRP2 is made sufficiently slow release so as to mask out this particular occurrence of the opening of the stick circuit. This is indicated by the line for the relay TRP2 in Fig. 4 which indicates that this relay drops away at the point 72. The oscillators A2 and B2 swing back and forth on their cyclic operations and by observing the points of openings of their respective contacts it will be seen that the opening of these contacts 56 and 57 are not simultaneous until the points 73 and 74 are reached. The relay SR2 is very quick acting and this momentary opening of its stick circuit results in its release at the point 75. In this way, a predetermined time is measured following the release of the track relay TR2. As soon as the relay SR2 is released, front contact 64 is opened so that the oscillators A2 and B2 cease to be further driven and they will come to rest, in which condition they will remain until the track relay TR2 is restored to an energized picked up condition. It should be obvious that the picking up of the track relay TR2 will restore the oscillators A2 and B2 to their normally energized positions. This energy is, of course, a normal energization which will operate their armatures to their respective positions, and such energization is, of course, greater than that supplied through the resistors 62 and 63.

It should be noted that in the event of failure of the circuits for the oscillators, they would be deenergized and assume central positions in which the contacts 56 and 57 would be open. Should the track relay TR2 be released at that time, the relay SR2 would then release as soon as its pick-up circuit were opened at front contact 54 of repeater relay TRP2. In brief, the erroneous unauthorized opening or breaking of any of the circuits in this timing organization results in the operation of contact 58 almost immediately following the release of track relay TR2 in contradistinction to the usual time period which would elapse before the release of this relay SR2 under a regular timing operation.

It should be understood that the relative frequencies of operation between the oscillators A2 and B2 may be of any suitable value, and that the longer time to be measured will require that these frequencies be more nearly the same. The particular frequencies shown in Fig. 4 are merely for the purposes of illustration.

Having described two forms of timing organization as specific embodiments of the present invention, it is desired to be understood that these forms have been selected to facilitate in the disclosure of the invention rather than to limit the number of forms which it may assume; and, it is to be further understood that various modifications, adaptations, and alterations may be applied to the specific forms shown to meet the requirements of practice without in any manner departing from the spirit or scope of the present invention.

What I claim is:

1. In a timing organization, a device at times operable to mark the initiation of a timing operation, two mechanically resonant type electromagnetic oscillators having corresponding normally energized starting positions and each having normally closed contacts momentarily opened during particular portions of each cyclic operation, said oscillators having natural resonant frequencies of oscillation differing by a predetermined amount, controlling circuit means responsive to the operation of said device for deenergizing and initiating said two oscillators into operation, and circuit means including said contacts connected in multiple and energized from an external source of energy subject to the operated positions of said contacts alternatively and being distinctively responsive to a coincidental opening of said contacts on both said oscillators a predetermined time after both said oscillators have been initiated dependent upon the difference in frequencies of said oscillators.

2. In a timing organization, a device marking the initiation of a timing operation, two pendulum type electromagnetic oscillators each having a slightly different frequency and each having contacts operated during a portion of each cycle of its oscillatory operation, and each oscillator being normally energized to a positive starting position, circuit means controlled by said device for simultaneously deenergizing and initiating operation of both said oscillators, and a stick relay having a stick circuit receiving an intermittent energization from an external source of energy subject to the operated positions of said contacts alternatively and being controlled by said contacts to be opened only after said oscillators have taken a predetermined number of cyclic operations, whereby the release of said stick relay marks the end of a predetermined time following the marking of the beginning of such time by said device dependent upon the difference in frequencies of said oscillators.

3. In a timing organization, a device marking the initiation of a timing operation, two pendulum type oscillators each having a slightly different natural frequency, and each having normally closed contacts which are opened momentarily during a particular portion of each cycle of its oscillatory operation, circuit means controlled by said device upon its operation for simultaneously initiating operation of both said oscillators, a stick relay, a pick-up circuit for said stick relay normally closed while said device is not actuated, a stick circuit for said stick relay including its own front contact and said contacts of said oscillators in multiple so as to be momentarily opened only after said oscillators have taken a predetermined number of cyclic operations after their initiation, whereby the release of said stick relay marks the end of a predetermined time following the actuation of said device, and whereby the return of said device to its normal condition restores said stick relay to an energized condition.

4. In a timing organization, two mechanically resonant oscillators of the pendulum type having respectively different natural frequencies of oscillations, and both of said oscillators being normally held in starting positions from which they can simultaneously be released to perform freely swinging cycles of operation, contacts for each of said oscillators normally closed while its oscillator is in a starting position and opened only during a portion of each of its cycles of operation, a stick relay having a normally energized pick-up circuit and having a stick circuit including said contacts of said oscillators in multiple, and control means for at times causing simultaneous initiation of said oscillators and the opening of said energized pick-up circuit for said stick relay, whereby said stick relay is released after a predetermined number of cyclic operations of said oscillators in accordance with the beat frequency formed by their respective natural frequencies.

5. In a timing organization, a device marking the beginning of a timing operation, two pendulum type oscillators each having a starting position from which it can be released to freely operate through a number of cyclic operations, said oscillators having their pendulums constructed to have slightly different natural frequencies, contacts on each oscillator being normally closed while such oscillator is in said starting position and which are momentarily opened during a particular portion of each cycle of its cyclic operations, circuit means controlled by said device for simultaneously releasing both of said oscillators into their cyclic operations, a stick relay, a pick-up circuit for said stick relay normally energized while said device is not actuated, a stick circuit for said stick relay including its own front contact and contacts of said oscillator in multiple so as to be momentarily opened after said oscillators have taken a predetermined number of cyclic operations, whereby the release of said stick relay marks the end of a predetermined time following the actuation of said device, and whereby the return of said device to its normal condition restores said stick relay to an energized condition.

References Cited in the file of this patent

UNITED STATES PATENTS

| | | |
|---|---|---|
| 2,070,238 | Poole | Feb. 9, 1937 |
| 2,231,174 | Trogner | Feb. 11, 1941 |
| 2,465,794 | Fereday | Mar. 29, 1949 |
| 2,534,144 | Price | Dec. 12, 1950 |
| 2,591,937 | Herrick | Apr. 8, 1952 |
| 2,658,172 | Heubauer | Nov. 3, 1953 |